US010305129B2

(12) United States Patent
Sakai et al.

(10) Patent No.: US 10,305,129 B2
(45) Date of Patent: May 28, 2019

(54) FUEL BATTERY SYSTEM AND CONTROL METHOD FOR FUEL BATTERY SYSTEM

(71) Applicant: HONDA MOTOR CO., LTD., Tokyo (JP)

(72) Inventors: Yasutaka Sakai, Wako (JP); Kuniaki Ojima, Wako (JP); Masaaki Komatsu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 13 days.

(21) Appl. No.: 15/406,785

(22) Filed: Jan. 16, 2017

(65) Prior Publication Data
US 2017/0250427 A1 Aug. 31, 2017

(30) Foreign Application Priority Data

Feb. 26, 2016 (JP) .................. 2016-035063

(51) Int. Cl.
*H01M 8/04* (2016.01)
*H01M 8/04992* (2016.01)
*B60L 11/18* (2006.01)
*H01M 8/04082* (2016.01)
*H01M 8/04664* (2016.01)
(Continued)

(52) U.S. Cl.
CPC ..... *H01M 8/04992* (2013.01); *B60L 11/1881* (2013.01); *H01M 8/04089* (2013.01); *H01M 8/04201* (2013.01); *H01M 8/04253* (2013.01); *H01M 8/04686* (2013.01); *H01M 8/04731* (2013.01); *H01M 8/04865* (2013.01); *H01M 8/04888* (2013.01); *H01M 8/04947* (2013.01); *H01M 16/006* (2013.01); *H01M 2250/20* (2013.01); *Y02T 90/32* (2013.01)

(58) Field of Classification Search
CPC ........... H01M 8/04992; H01M 8/1881; H01M 8/04089; H01M 8/04201; H01M 8/04253; H01M 8/04686; H01M 8/04731; H01M 8/04865; H01M 8/04888; H01M 8/04947; H01M 16/006; H01M 2250/20; Y02T 90/32
USPC ....................................... 429/432
See application file for complete search history.

(56) References Cited

FOREIGN PATENT DOCUMENTS

JP 2010-172155 8/2010
JP 2010-287534 12/2010
(Continued)

OTHER PUBLICATIONS

Japanese Office Action for corresponding JP Application No. 2016-035063, dated Sep. 5, 2017.

*Primary Examiner* — Anthony R Jimenez
(74) *Attorney, Agent, or Firm* — Mori & Ward, LLP

(57) ABSTRACT

A fuel battery system includes a fuel battery, an electric storage, a voltage adjuster, a pump, an abnormity detector, and circuitry. The fuel battery generates electricity using fuel gas and oxidant gas. The voltage adjuster is connected to at least one of the fuel battery and the electric storage. The voltage adjuster is configured to adjust voltage output from the fuel battery or the electric storage to output the adjusted voltage to a load. The pump supplies the oxidant gas to the fuel battery using electric power output from at least one of the fuel battery and the electric storage. The voltage adjuster is connected between the fuel battery and the pump. The abnormity detector detects abnormity in the voltage adjuster. The circuitry is configured to restrict the electric power supplied to the pump in a case where the abnormity detector detects the abnormity in the voltage adjuster.

9 Claims, 7 Drawing Sheets

(51) Int. Cl.
*H01M 8/04701* (2016.01)
*H01M 8/04858* (2016.01)
*H01M 8/04828* (2016.01)
*H01M 16/00* (2006.01)
*H01M 8/04089* (2016.01)
*H01M 8/04223* (2016.01)

(56) References Cited

FOREIGN PATENT DOCUMENTS

| | | |
|---|---|---|
| JP | WO2013/051394 | 4/2013 |
| JP | WO2016/021064 | 2/2016 |
| WO | WO 2011/013213 | 2/2011 |

FUEL BATTERY SYSTEM AND CONTROL METHOD FOR FUEL BATTERY SYSTEM

CROSS-REFERENCE TO RELATED APPLICATIONS

The present application claims priority under 35 U.S.C. § 119 to Japanese Patent Application No. 2016-035063, filed Feb. 26, 2016, entitled "Fuel Battery System." The contents of this application are incorporated herein by reference in their entirety.

BACKGROUND

1. Field

The present disclosure relates to a fuel battery system and a control method for a fuel battery system.

2. Description of the Related Art

International Publication No. 2011/013213 discloses a fuel battery system (fuel battery vehicle) in which a fuel battery and a battery are connected with a traction motor in parallel. A step-up converter is connected between the fuel battery and the traction motor, and a step-up/step-down converter is connected between the battery and the traction motor. In this fuel battery system, high-voltage auxiliary machines are connected between the battery and the step-up/step-down converter. The auxiliary machines include a step-down converter that performs step-down of voltage of a fuel battery or a high-voltage battery and applies the voltage to a low-voltage auxiliary machine, and an air pump (air compressor) that supplies air to a fuel battery.

In the fuel battery system, when abnormity occurs to a converter, supplied electric power of the converter is restricted. For example, when the temperature of the step-up converter is increased due to, for example, abnormity in a cooling system, an ECU restricts, to be equal to or lower than a predetermined value, electric power (also referred to as passing power) supplied by the step-up converter from the primary side to the secondary side. Similarly, when the temperature of the step-up/step-down converter is increases, the ECU restricts, to be equal to lower than a predetermined value, electric power supplied from the primary side to the secondary side and electric power supplied from the secondary side to the primary side by the step-up/step-down converter.

SUMMARY

According to a first aspect of the present invention, a fuel battery system includes a fuel battery, an electric storage device, a voltage adjusting device, a pump, a control device, and an abnormity detecting device. The fuel battery is configured to generate electricity by using fuel gas and oxidant gas. The voltage adjusting device is configured to adjust voltage to be applied to a load by the fuel battery or the electric storage device. The pump is configured to supply the oxidant gas to the fuel battery by consuming electric power supplied from the fuel battery and/or the electric storage device. The control device is configured to control electric power of the pump. The abnormity detecting device is configured to detect abnormity of the voltage adjusting device. The voltage adjusting device is disposed between the fuel battery and the pump. The control device restricts the electric power of the pump when the abnormity detecting device has detected abnormity of the voltage adjusting device.

According to a second aspect of the present invention, a fuel battery system includes a fuel battery, an electric storage, a voltage adjuster, a pump, an abnormity detector, and circuitry. The fuel battery generates electricity using fuel gas and oxidant gas. The voltage adjuster is connected to at least one of the fuel battery and the electric storage. The voltage adjuster is configured to adjust voltage output from the fuel battery or the electric storage to output the adjusted voltage to a load. The pump supplies the oxidant gas to the fuel battery using electric power output from at least one of the fuel battery and the electric storage. The voltage adjuster is connected between the fuel battery and the pump. The abnormity detector detects abnormity in the voltage adjuster. The circuitry is configured to restrict the electric power supplied to the pump in a case where the abnormity detector detects the abnormity in the voltage adjuster.

According to a third aspect of the present invention, a control method for fuel battery system including a fuel battery, an electric storage, a voltage adjuster to adjust voltage output from the fuel battery or the electric storage to output the adjusted voltage to a load, and a pump to supply an oxidant gas to the fuel battery using electric power output from at least one of the fuel battery and the electric storage, the voltage adjuster being connected between the fuel battery and the pump, the control method includes detecting abnormity in the voltage adjuster. The electric power supplied to the pump is restricted in a case where the abnormity in the voltage adjuster is detected.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
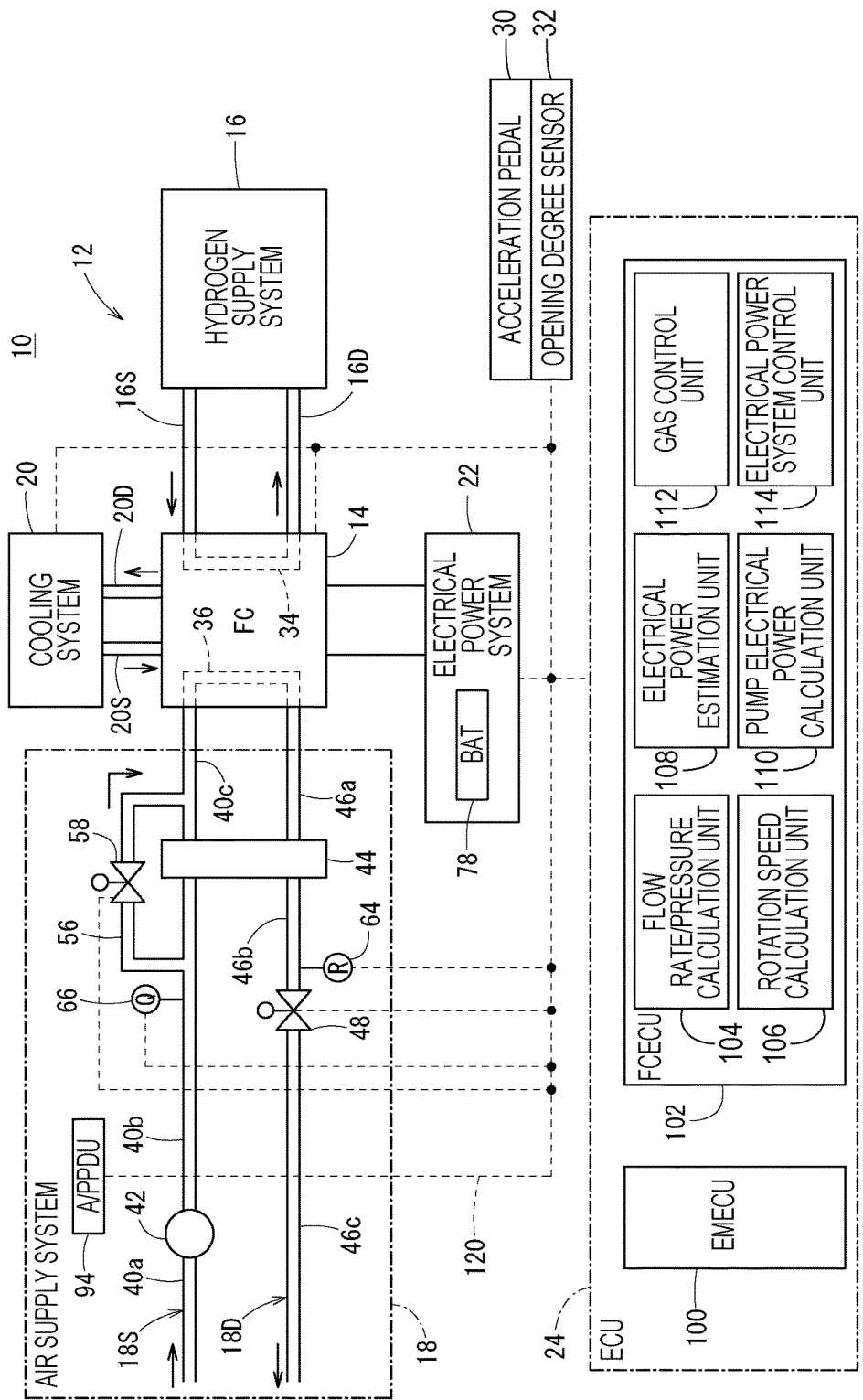
FIG. 1 is a diagram of the entire configuration of a fuel battery (FC) system according to the present embodiment.

The embodiments will now be described with reference to the accompanying drawings, wherein like reference numerals designate corresponding or identical elements throughout the various drawings.

Preferred embodiments will be described below in detail with reference to the accompanying drawings.

1. Entire Configuration of Fuel Battery System 12

The following describes the configuration of a fuel battery system 12 (also referred to as a FC system 12) with reference to FIG. 1. The FC system 12 according to the present embodiment may employ a known basic device configuration. For example, a configuration disclosed in Japanese Unexamined Patent Application Publication No. 2016-12480 may be employed. In the present specification, description is focused on any configuration related to inventive characteristics, and description (and illustration) of any known configuration will be omitted or simplified. The present embodiment assumes a fuel battery vehicle 10 (also simply referred to as a vehicle 10) on which the FC system 12 is mounted.

The FC system 12 mounted on the vehicle 10 includes a fuel battery 14 (also referred to as a FC 14), a hydrogen supply system 16, an air supply system 18, a cooling system 20, an electric power system 22, and an ECU 24. The FC system 12 also includes an opening degree sensor 32 configured to detect the degree of opening (operation amount) of an acceleration pedal 30.

The FC 14 has a structure including a stack of fuel battery cells each including a solid polymer electrolyte film interposed between an anode electrode and a cathode electrode. Hydrogen gas as fuel gas is supplied to the anode electrode through an anode flow path 34, and air as oxidant gas is supplied to the cathode electrode through a cathode flow path 36. Reaction of the hydrogen gas and oxygen in the air generates water and electric power.

[1.1 Hydrogen Supply System 16]

The hydrogen supply system 16 supplies hydrogen gas to the FC 14 through a hydrogen supply flow path 16S, and discharges anode off-gas generated at the FC 14 through a gas discharge flow path 16D. The hydrogen supply flow path 16S and the gas discharge flow path 16D are communicated with the anode flow path 34.

[1.2 Air Supply System 18]

The air supply system 18 supplies air to the FC 14 through an air supply flow path 18S, and discharges cathode off-gas generated at the FC 14 through a gas discharge flow path 18D. The air supply flow path 18S includes a pipe 40a, an air pump 42, a pipe 40b, a humidifier 44, and a pipe 40c in this order from the upstream side (intake side). The pipe 40c on the downstream side is communicated with the cathode flow path 36 of the FC 14. The gas discharge flow path 18D includes a pipe 46a, the humidifier 44, a pipe 46b, a back-pressure valve 48, and a pipe 46c in this order from the upstream side (FC 14 side). The pipe 46a on the upstream side is communicated with the cathode flow path 36 of the FC 14. A pipe 52 is provided with a circulation pump 54. The pipe 40b and the pipe 40c of the air supply flow path 18S are connected with each other through a pipe 56 bypassing the humidifier 44. The pipe 56 is provided with a valve 58. The pipe 46b is provided with a pressure sensor 64. The pipe 40b is provided with a flow rate sensor 66.

The air pump 42 takes in external air through the pipe 40a and pumps the external air to the cathode flow path 36 of the FC 14 through, for example, the pipe 40b, the humidifier 44, and the pipe 40c. The humidifier 44 humidifies the air supplied from the air pump 42 by using the cathode off-gas discharged from the FC 14. The back-pressure valve 48 adjusts pressure in the cathode flow path 36 of the FC 14 by adjusting the degree of opening of the valve in response to a control signal outputted from the ECU 24. The air pump 42, the back-pressure valve 48, the valve 58 are individually controlled by the ECU 24. A pressure value detected by the pressure sensor 64 is outputted to the ECU 24, and the degree of opening of the back-pressure valve 48 is controlled such that the pressure value becomes equal to a predetermined value. An actual flow rate value air detected by the flow rate sensor 66 is outputted to the ECU 24.

[1.3 Cooling System 20]

The cooling system 20 supplies refrigerant to the FC 14 through a refrigerant supply flow path 20S, and recovers the refrigerant from the FC 14 through a refrigerant discharge flow path 20D. The refrigerant circulates between the cooling system 20 and the FC 14, absorbing heat at the FC 14 and releasing the heat at the cooling system 20.

[1.4 Electric Power System 22]

Figure 2:
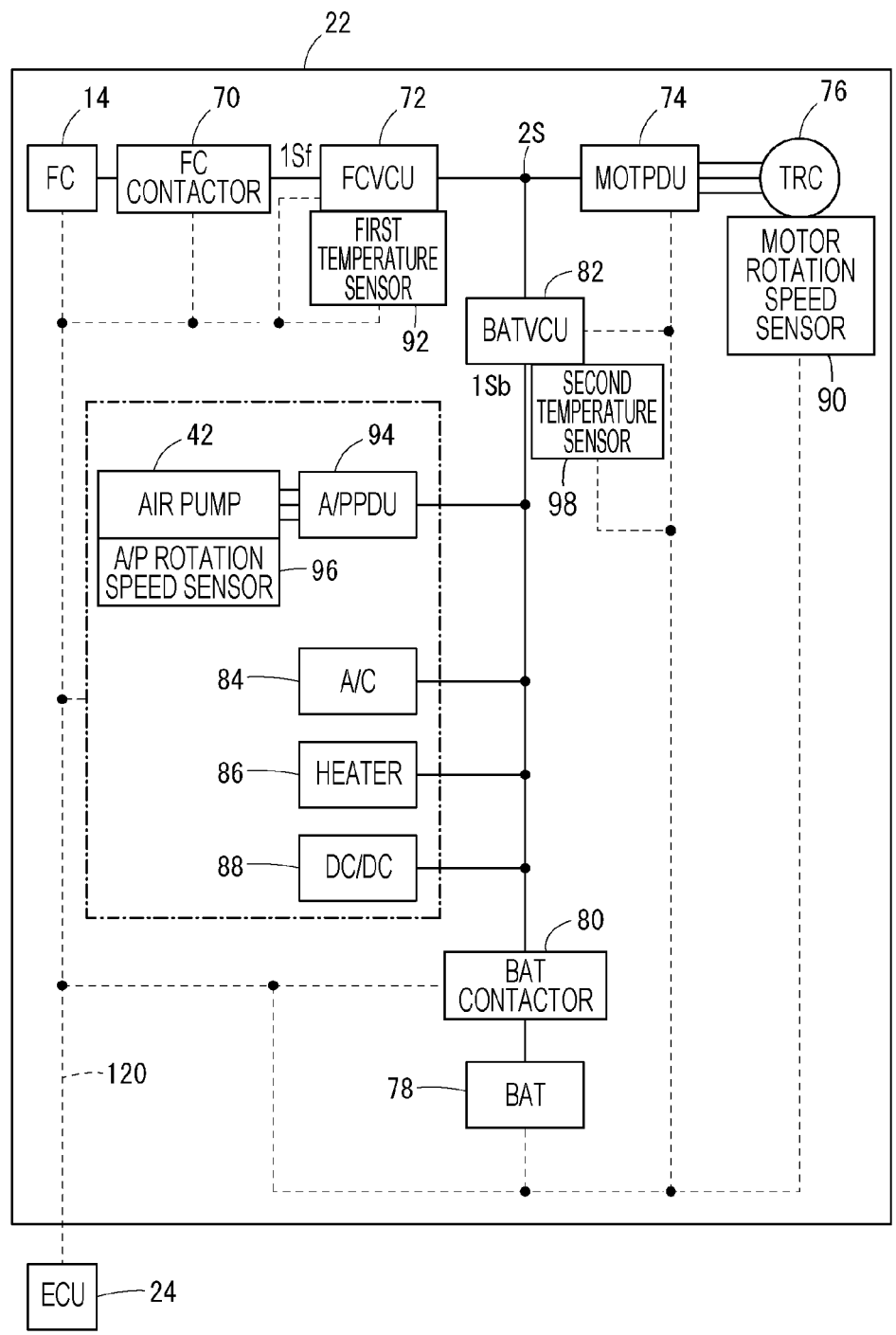
FIG. 2 is a block diagram of an electric power system included in the fuel battery system.

The following describes the electric power system 22 with reference to FIG. 2. The FC 14 is connected with a traction motor 76 (also referred to as a TRC 76) through a FC contactor 70, a step-up converter 72 (also referred to as a FCVCU (voltage control unit) 72), and an inverter 74 (also referred to as a MOTPDU (power drive unit) 74). A high voltage battery 78 (also referred to as a BAT 78) is connected with the TRC 76 through a BAT contactor 80 and a step-up/step-down converter 82 (also referred to as a BATVCU 82). The FCVCU 72 and the BATVCU 82 are connected with the TRC 76 in parallel on a secondary side 2S. The BATVCU 82 is connected with various high-voltage auxiliary machines such as the air pump 42, an air conditioner 84 (also referred to as an A/C 84), a heater 86, and a step-down converter 88 (also referred to as a DC/DC 88) in parallel on a primary side 1Sb. The A/C 84 and the heater 86 also function as a defroster device.

The FC contactor 70 switches disconnection and connection between the FC 14 and a primary side 1Sf of the FCVCU 72 in response to an opening/closing signal outputted from the ECU 24. The FCVCU 72 is a voltage adjusting device including a chopper circuit, and performs step-up of voltage on the primary side 1Sf in response to a control signal from the ECU 24 to apply the voltage on the secondary side 2S. The MOTPDU 74 has a three-phase bridge configuration, converts direct-current voltage on the secondary side 2S into alternating current voltage, and controls the TRC 76 in response to a control signal of a target rotation speed outputted from the ECU 24. At regeneration, the MOTPDU 74 functions as a converter and converts alternating current voltage generated at the TRC 76 into direct-current voltage. The MOTPDU 74 and the TRC 76 are what is called loads. The TRC 76 is driven by electric power of the FC 14 and/or the BAT 78, and functions as an electric generator at regeneration. The TRC 76 is provided with a motor rotation speed sensor 90. The motor rotation speed sensor 90 detects the rotation speed of the TRC 76 and outputs a rotation speed signal to the ECU 24.

The BAT 78 discharges an insufficient power generation amount of the FC 14 relative to actual electric power consumption at discharging drive, and charges any surplus power generation amounts of the FC 14 and the loads relative to the actual electric power consumption at regeneration. The SOC of the BAT 78 is monitored by the ECU 24. The BAT contactor 80 switches and disconnection and connection between the BAT 78 and the primary side 1Sb of the BATVCU 82 in response to an opening/closing signal outputted from the ECU 24. The BATVCU 82 is a voltage adjusting device including the chopper circuit, and performs, in response to a control signal outputted from the ECU 24, step-up of voltage on the primary side 1Sb at discharging drive to apply the voltage to the secondary side 2S, and step-down of voltage on the secondary side 2S to apply the voltage to the primary side 1Sb at regeneration.

The air pump 42 included in the air supply system 18 (FIG. 1) is connected with the primary side 1Sb of the BATVCU 82 through an air pump PDU 94 (also referred to as an A/PPDU 94). The A/PPDU 94 includes a three-phase bridge inverter, converts direct-current voltage on the primary side 1Sb into alternating current voltage, and controls the air pump 42 in response to a control signal of a target rotation speed outputted from the ECU 24. A pump rotation speed sensor 96 (also referred to as an A/P rotation speed sensor 96) detects the rotation speed of the air pump 42, and outputs a rotation speed signal to the ECU 24.

The FCVCU 72 is provided with a first temperature sensor 92. The first temperature sensor 92 detects the temperature of the FCVCU 72, and outputs a temperature signal to the ECU 24. Similarly, the BATVCU 82 is provided with a second temperature sensor 98. The second temperature sensor 98 detects the temperature of the BATVCU 82, and outputs a temperature signal to the ECU 24. The first temperature sensor 92 and the second temperature sensor 98 function as abnormity detecting devices configured to detect temperature abnormity of the FCVCU 72 and the BATVCU 82, respectively.

[1.5 ECU 24]

The following describes the ECU 24 with reference to FIGS. 1 and 2. The ECU 24 includes an energy management ECU 100 (also referred to as an EMECU 100) and a FCECU 102. The ECUs 100 and 102 are each a calculator including a micro computer, and includes, for example, a CPU, a ROM (including an EEPROM), a RAM, input and output devices such as an A/D converter and a D/A converter, and a timer as a timing unit. The ECUs 100 and 102 each function as various kinds of function achieving units (function achieving means) such as a control unit, a calculation unit, and a processing unit, by the CPU reading and executing computer programs recorded in the ROM. The ECUs 100 and 102 may each include only one ECU or a plurality of ECUs.

The EMECU 100 is configured to perform energy management (EM) of the FC system 12. The EMECU 100 is also configured to output a target electric power of the FC 14 as a current command value to the FCECU 102.

The FCECU 102 functions as a flow rate/pressure calculation unit 104, a rotation speed calculation unit 106, an electric power estimation unit 108, a pump electric power calculation unit 110, a gas control unit 112, and an electric power system control unit 114 by the CPU reading and executing computer programs recorded in the ROM.

The flow rate/pressure calculation unit 104 is configured to calculate target flow rate/pressure of the air pump 42. The rotation speed calculation unit 106 is configured to calculate the target rotation speed of the air pump 42 necessary for obtaining the target flow rate. The electric power estimation unit 108 is configured to calculate an electric power estimation value. The electric power estimation value is electric power that the air pump 42 needs to achieve the flow rate and a pressure ratio (ratio of pressures on a supply side and on a discharging side of the air pump 42) of the air pump 42.

The pump electric power calculation unit 110 is configured to calculate the upper limit Pul of electric power consumption of the air pump 42. The pump electric power calculation unit 110 is also configured to restrict the upper limit Pul of electric power consumption of the air pump 42 when abnormity occurs in the FCVCU 72 or the BATVCU 82, for example, when an abnormal temperature equal to or higher than a predetermined temperature is detected by the first temperature sensor 92 or the second temperature sensor 98. The upper limit Pul of electric power consumption is an upper limit of electric power allowed for the air pump 42 being driven, and is set to be a rated value of the air pump 42 when no abnormity occurs in the FCVCU 72 or the BATVCU 82.

The gas control unit 112 is configured to perform gas control of the hydrogen supply system 16 and the air supply system 18. The gas control unit 112 is configured to perform feedback control of the back-pressure valve 48 in accordance with a value detected by the pressure sensor 64 and a target pressure.

The electric power system control unit 114 is configured to control the electric power system 22 (the FC contactor 70, the FCVCU 72, the MOTPDU 74, the BAT contactor 80, the BATVCU 82, the air pump 42, and the high-voltage auxiliary machines 84, 86, and 88) based on energy management performed by the EMECU 100. The electric power system control unit 114 is also configured to restrict passing power of the FCVCU 72 when abnormity occurs to the FCVCU 72, for example, when an abnormal temperature is detected by the first temperature sensor 92. The electric power system control unit 114 is also configured to restrict passing power of the BATVCU 82 when abnormity occurs to the BATVCU 82, for example, when an abnormal temperature is detected by the second temperature sensor 98.

The ECUs 100 and 102 are each connected with devices such as the hydrogen supply system 16, the air supply system 18, the cooling system 20, and the electric power system 22 through a signal line 120 to perform communication therebetween. The ECUs 100 and 102 each control the devices by executing computer programs stored in the ROM to detect, for example, values detected by sensors such as the opening degree sensor 32, the pressure sensor 64, the flow rate sensor 66, the first temperature sensor 92, the second temperature sensor 98, and the A/P rotation speed sensor 96, the voltage and current of the FC 14, the voltage, current, and rotation speed of the air pump 42, the voltage, current, rotation speed of the TRC 76, the voltage, current, temperature, and SOC of the BAT 78, and the voltage and current of the secondary side 2S.

2. Processing at FC System 12

Figure 3:
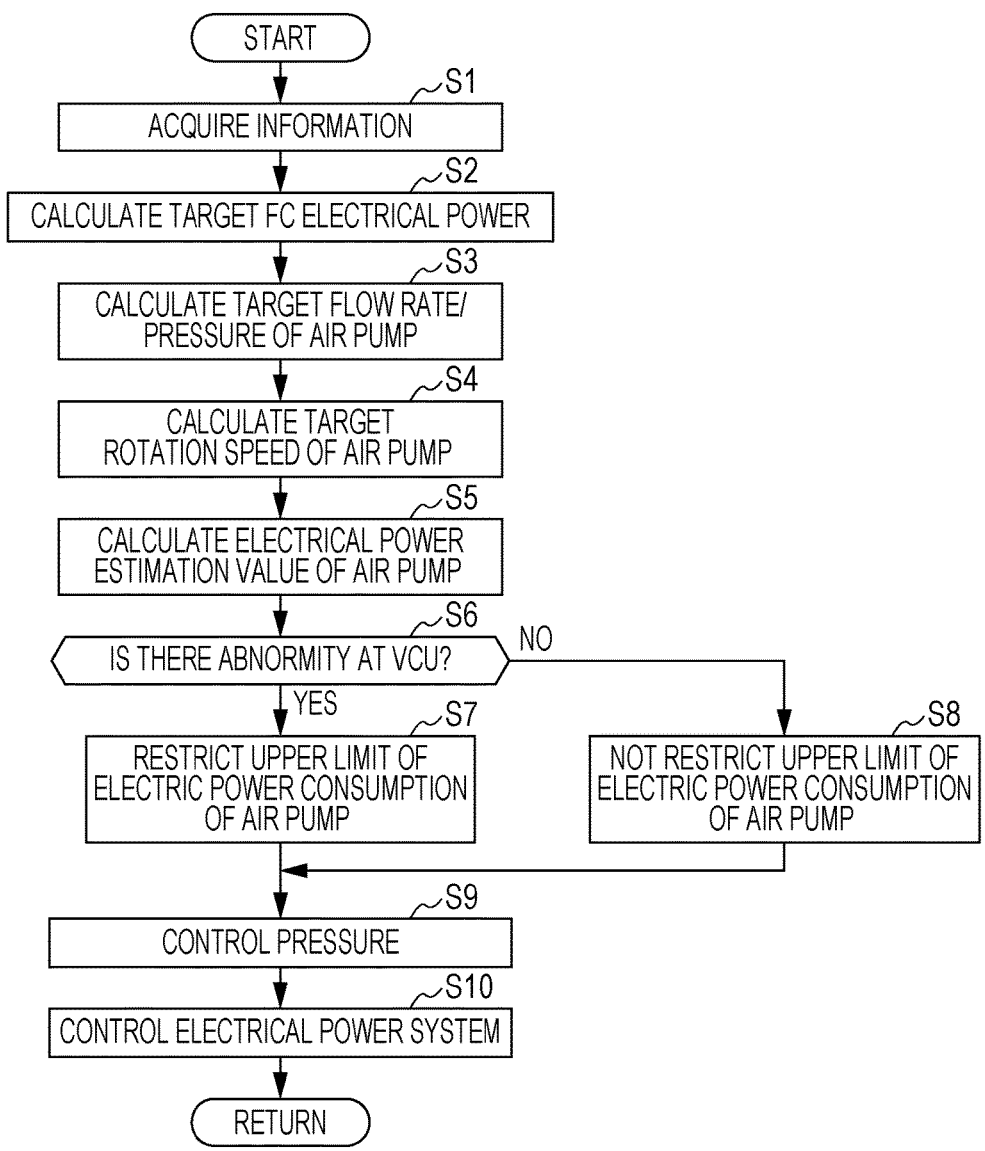
FIG. 3 is a flowchart of processing performed in the FC system.

The following describes processing performed at the FC system 12 by using a flowchart illustrated in FIG. 3 with reference to FIGS. 1 and 2 as appropriate. When abnormity occurs in the FCVCU 72 or the BATVCU 82, the passing power of the FCVCU 72 or the BATVCU 82 is restricted by the electric power system control unit 114 in addition to the following processing.

At step S1, the ECU 24 monitors an operation condition of each device, and acquires various kinds of information through reception of detection signals by various sensors.

At step S2, the EMECU 100 calculates a power generation amount, in other words, a target electric power required for the FC 14 based on the acquired information. In this calculation, the EMECU 100 has a feedback of the electric power estimation value previously calculated by the electric power estimation unit 108 of the FCECU 102. The EMECU 100 calculates chargeable/dischargeable electric power of the BAT 78 based on the electric power estimation value, and determines electric power consumption and regeneration electric power allocable to the load and the high-voltage auxiliary machines. Then, the EMECU 100 calculates the target electric power of the FC 14 so that total electric power generated/consumed in the FC system 12 is zero. The target electric power is outputted to the FCECU 102 as a current command value.

At step S3, the flow rate/pressure calculation unit 104 calculates the target flow rate/pressure of the air pump 42 necessary for obtaining the target electric power of the FC 14 based on the current command value.

At step S4, the rotation speed calculation unit 106 calculates the target rotation speed of the air pump 42 necessary for obtaining the target flow rate by using the target current and pressure calculated by the flow rate/pressure calculation unit 104 and a value detected by the A/P rotation speed sensor 96 of the air pump 42.

At step S5, the electric power estimation unit 108 calculates the electric power estimation value by using the target current and pressure calculated by the flow rate/pressure calculation unit 104. The calculated electric power estimation value is fed back to the EMECU 100 for next target electric power calculation. The electric power estimation value is obtained from, for example, an electric power calculation map that takes a flow rate and a pressure ratio as inputs.

At step S6, the process transitions to step S7 if there is abnormity at the FCVCU 72 or the BATVCU 82 (YES at step S6), or transitions to step S8 if there is no abnormity (NO at step S6). Any temperature abnormity at the FCVCU 72 and the BATVCU 82 is determined based on whether temperatures detected by the first temperature sensor 92 and the second temperature sensor 98 are equal to or higher than a predetermined temperature.

At step S7, the pump electric power calculation unit 110 restricts the upper limit Pul of electric power consumption of the air pump 42. Specifically, the electric power system control unit 114 restricts the passing power of the FCVCU 72 or the BATVCU 82. The pump electric power calculation unit 110 restricts the upper limit Pul of electric power consumption of the air pump 42 by a predetermined method. The predetermined method will be described in section [4] below. At step S8, the pump electric power calculation unit 110 does not restrict the upper limit Pul of electric power consumption of the air pump 42.

At step S9, the electric power system control unit 114 controls the electric power system 22 so that charge and discharge amounts of the BAT 78 do not exceed a charge upper limit and a discharge lower limit, respectively. Specifically, the electric power system control unit 114 controls the air pump 42 based on the target rotation speed calculated by the rotation speed calculation unit 106 through the A/PPDU 94. The electric power system control unit 114 controls the electric power of the air pump 42 to be equal to or lower than the upper limit Pul of electric power consumption calculated by the pump electric power calculation unit 110.

At step S10, the gas control unit 112 performs feedback control of the back-pressure valve 48 while monitoring a pressure value detected by the pressure sensor 64 to set a cathode pressure to be the target pressure calculated by the flow rate/pressure calculation unit 104.

3. Priority of Electric Power Supply

When the electric power system control unit 114 restricts the passing power of the FCVCU 72 or the BATVCU 82, the electric power of the FC 14 usable by the auxiliary machines including the air pump 42 is limited. The auxiliary machines include the air pump 42, the DC/DC 88, and the A/C 84 as a defroster device and the heater 86. The auxiliary machines do not include the A/C 84 that does not function as a defroster device, in other words, the A/C 84 used as an air conditioning device. In the present embodiment, priority of electric power supply to these auxiliary machines is determined in advance. The following lists the priorities in descending order.

Maximum value Pdc of electric power consumption of the DC/DC 88
Lower limit Pll of electric power consumption of the air pump 42
Electric power consumption Pde of the A/C 84 as a defroster device and the heater 86
Upper limit Pul of electric power consumption of the air pump 42

The DC/DC 88 performs step-down of the voltage of the FC 14 or the BAT 78, and applies the voltage to, for example, each ECU of the vehicle 10. When the electric power of the DC/DC 88 is restricted, operation of the ECUs and the like is affected to stop actuation of the system. Thus, the maximum value Pdc of electric power consumption of the DC/DC 88 has the highest priority. The lower limit Pll of electric power consumption of the air pump 42 is electric power required for the air pump 42 so that the FC 14 generates minimum necessary electric power at, for example, failure of the vehicle 10. Thus, the lower limit Pll of electric power consumption of the air pump 42 has a higher priority. A defroster function is needed to provide visibility. Thus, the electric power consumption Pde of the A/C 84 as a defroster device and the heater 86 has a higher priority. The passing power of the FCVCU 72 or the BATVCU 82 is allocated in accordance with these priorities, and any redundant electric power is allocated to the upper limit Pul of electric power consumption of the air pump 42.

4. Processing at Pump Electric Power Calculation Unit 110

When the passing power of the FCVCU 72 or the BATVCU 82 is restricted, the pump electric power calculation unit 110 restricts the upper limit Pul of electric power consumption of the air pump 42 by a method described below. The passing power of the FCVCU 72 or the BATVCU 82 is represented by Pp below. A restricting value PA is set to be a value of Pp−Pdc−Pde obtained by subtracting, from the passing power Pp, the maximum value Pdc of electric power consumption of the DC/DC 88 and the electric power consumption Pde of the A/C 84 as a defroster device and the heater 86. The restricting value PA does not include the lower limit Pll of electric power consumption of the air pump 42 because the lower limit Pll of electric power consumption is allocated necessarily when the upper limit Pul of electric power consumption of the air pump 42 is allocated.

When the restricting value PA has abnormity of a rated upper limit of the air pump 42, the upper limit Pul of electric power consumption is set to be the rated upper limit. In this case, the upper limit Pul of electric power consumption is not effectively restricted. When the restricting value PA is smaller than the rated upper limit, the restricting value PA is set to be the upper limit Pul of electric power consumption. When the restricting value PA is equal to or smaller than zero, the upper limit Pul of electric power consumption of the air pump 42 is not set, and the electric power consumption is controlled not to be smaller than the lower limit Pll of electric power consumption.

Figure 4A:
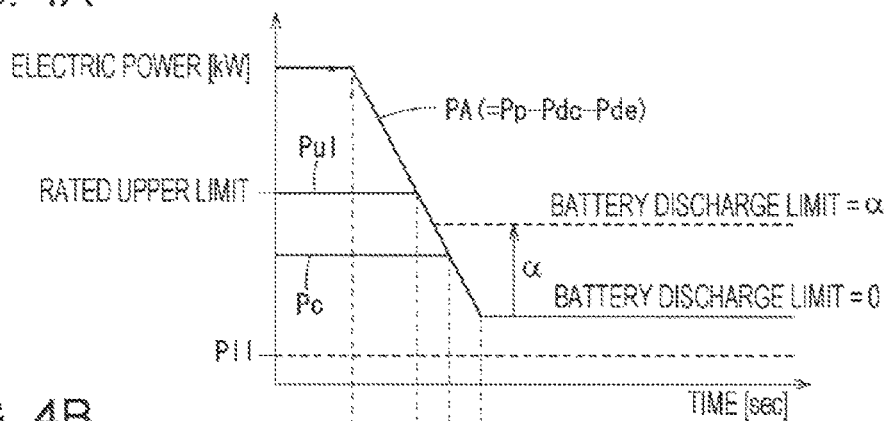
FIGS. 4A to 4C are each a timing chart illustrating changes at low-load traveling.

FIG. 4A illustrates temporal changes of the restricting value PA (=Pp−Pdc−Pde), the upper limit Pul of electric power consumption of the air pump 42, and an electric power consumption Pc of the air pump 42 when the passing power Pp of the FCVCU 72 or the BATVCU 82 is restricted. FIG. 4A illustrates the changes when the vehicle 10 is traveling at low load.

At time ta1, cooling abnormality occurs to the FCVCU 72 or the BATVCU 82, and the passing power Pp is restricted. Then, since the passing power is restricted by the electric power system control unit 114, the restricting value PA decreases. At this point, the restricting value PA is equal to or larger than the rated upper limit of the air pump 42. Then, the pump electric power calculation unit 110 sets the rated upper limit of the air pump 42 to be the upper limit Pul of electric power consumption. At time ta2, the restricting value PA becomes smaller than the rated upper limit of the air pump 42. At this point, the pump electric power calculation unit 110 sets the restricting value PA to be the upper limit Pul of electric power consumption. At time ta3, the upper limit Pul of electric power consumption=the restricting value PA becomes equal to the electric power consumption Pc of the air pump 42. At this point, the electric power system control unit 114 performs such control that the electric power consumption Pc of the air pump 42 does not exceed the upper limit Pul of electric power consumption=the restricting value PA. At time ta4, the upper limit Pul of electric power consumption=the restricting value PA stops decreasing. At this point, the upper limit Pul of electric power consumption=the restricting value PA is larger than the lower limit Pll of electric power consumption. When the dischargeable electric power of the BAT 78 is $\alpha$, the upper limit Pul of electric power consumption may be set to be a sum of the restricting value PA and $\alpha$.

5. Processing to Avoid Surge of Air Pump 42

Figure 4B:
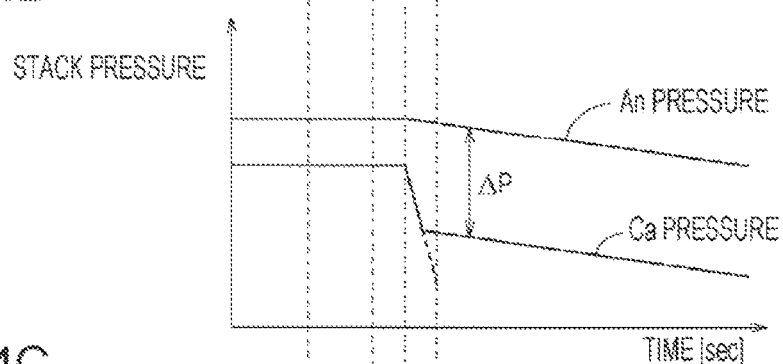
Figure 4C:
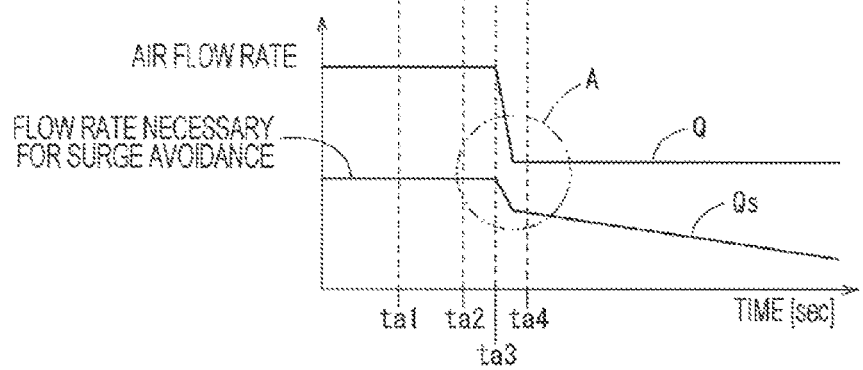

FIG. 4B illustrates a gas pressure of the FC 14 at the times in FIG. 4A, and FIG. 4C illustrate an air flow rate at the times in FIG. 4A. As illustrated in FIGS. 4A and 4B, at time ta3, the cathode pressure (Ca pressure) abruptly decreases, but is controlled so that a pressure difference between the cathode pressure and the anode pressure (An pressure) is within a constant value $\Delta P$ [kpa]. As illustrated in FIG. 4C, an air flow rate Q temporarily decreases as the Ca pressure decreases.

When the electric power consumption Pc of the air pump 42 abruptly decreases and the air flow rate Q abruptly decreases, surge that prevents operation of the air pump 42 potentially occurs. When the air pump 42 is operational, an air flow rate Qs necessary for avoiding the surge is determined depending on a condition at the time. The behavior of the air flow rate Qs necessary for avoiding the surge substantially matches that of the Ca pressure. When the vehicle 10 travels at low load, as illustrated by range A in FIG. 4C, the air flow rate Q is unlikely to become lower than the air flow rate Qs necessary for avoiding the surge at the decrease of the electric power consumption Pc of the air pump 42 at time ta3 as illustrated in FIG. 4A. Thus, the surge is unlikely to occur. When the vehicle 10 travels at high load, however, the surge potentially occurs.

Figure 5A:
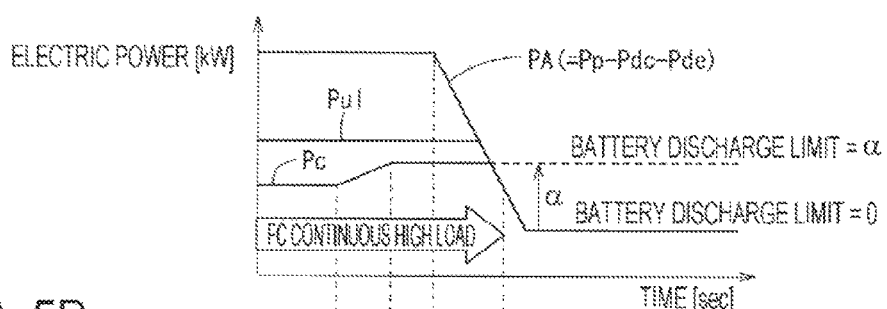
FIGS. 5A to 5C are each a timing chart illustrating changes at high-load traveling.
Figure 5B:
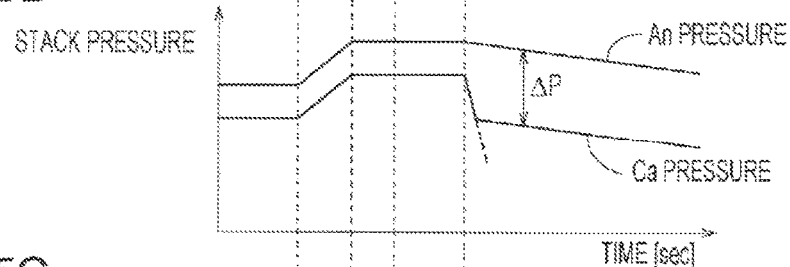
Figure 5C:
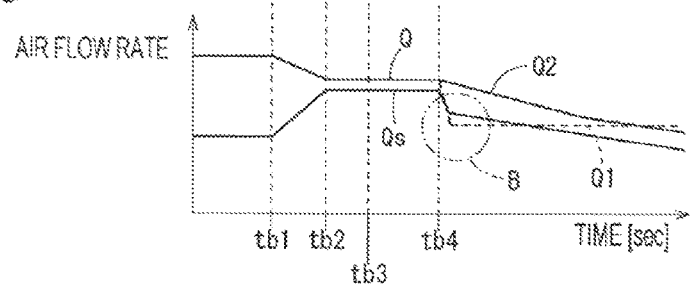

FIGS. 5A to 5C illustrate changes of the electric power, the gas pressure, and the air flow rate. When the vehicle 10 continuously travels at high load, at time tb1, the FC system 12 increases the An pressure and the Ca pressure, and decreases the air flow rate Q to suppress drying of the FC 14. In this case, the air flow rate Qs necessary for avoiding the surge increases along with the behavior of the Ca pressure, and thus becomes closer to the air flow rate Qs necessary for avoiding the surge at time tb2. Assume that, at time tb3, cooling abnormity occurs to the FCVCU 72 or the BATVCU 82, and the passing power Pp is restricted. Similarly to FIG. 4A, the upper limit Pul of electric power consumption=the restricting value PA becomes equal to the electric power consumption Pc of the air pump 42 at time tb4. When the electric power consumption Pc of the air pump 42 abruptly decreases together with the upper limit Pul of electric power consumption=the restricting value PA, the Ca pressure abruptly decreases. Then, as illustrated by range B in FIG. 5C, an air flow rate Q1 abruptly decreases and temporarily becomes lower than the air flow rate Qs necessary for avoiding the surge in some cases. In such a case, the operation of the air pump 42 is potentially prevented. In order to avoid the surge, an abrupt decrease needs to be suppressed like an air flow rate Q2 illustrated in FIG. 5C.

Figure 6:
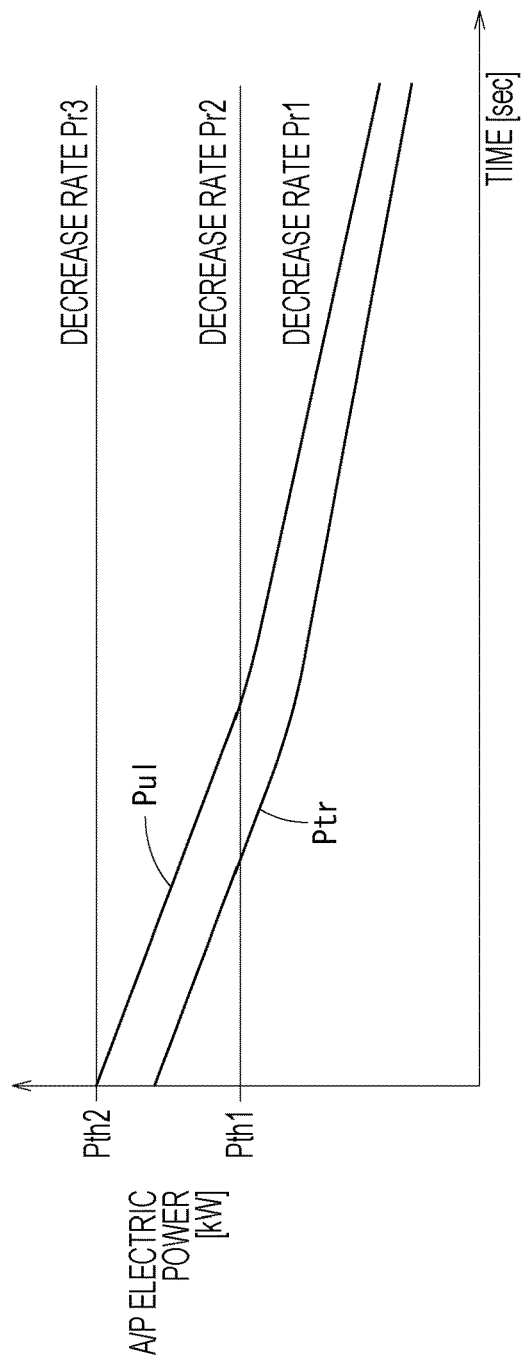
FIG. 6 is an explanatory diagram for description of a decrease rate.

In the present embodiment, the pump electric power calculation unit 110 decreases the upper limit Pul of electric power consumption based on a predetermined rate. In the present embodiment, as illustrated in FIG. 6, three decrease rates applied depending on the magnitude of electric power Ptr needed for the air pump 42 at the time are set. When the electric power Ptr is equal to or larger than Pth2, a decrease rate of the upper limit Pul of electric power consumption is set to Pr3. When the electric power Ptr is equal to or larger than Pth1 and smaller than Pth2, the decrease rate of the upper limit Pul of electric power consumption is set to Pr2 (<Pr3). When the electric power Ptr is smaller than Pth1, the decrease rate of the upper limit Pul of electric power consumption is set to Pr1 (<Pr2). In this manner, the upper limit Pul of electric power consumption is restricted with a larger decrease rate as the electric power Ptr need for the air pump 42 is larger, and is restricted with a smaller decrease rate as the electric power Ptr is smaller. The electric power Ptr maybe the electric power estimation value calculated by the electric power estimation unit 108. In the present embodiment, three decrease rates are set, but another number of decrease rates may be set. Alternatively, instead of decrease rates different in steps, a decrease rate that continuously changes depending on the electric power Ptr may be set.

In this manner, the decrease amount of the upper limit Pul of electric power consumption is larger as the electric power Ptr is larger, and as a result, the electric power consumption of the air pump 42 has a larger decrease amount. The decrease amount of the upper limit Pul of electric power consumption is smaller as the electric power Ptr is smaller, and as a result, the electric power consumption of the air pump 42 has a smaller decrease amount. With this configuration, the air flow rate can be suppressed from abruptly decreasing along with an abrupt decrease of the electric power consumption of the air pump 42, thereby preventing inoperability of the air pump 42.

6. Other Embodiments

Figure 7:
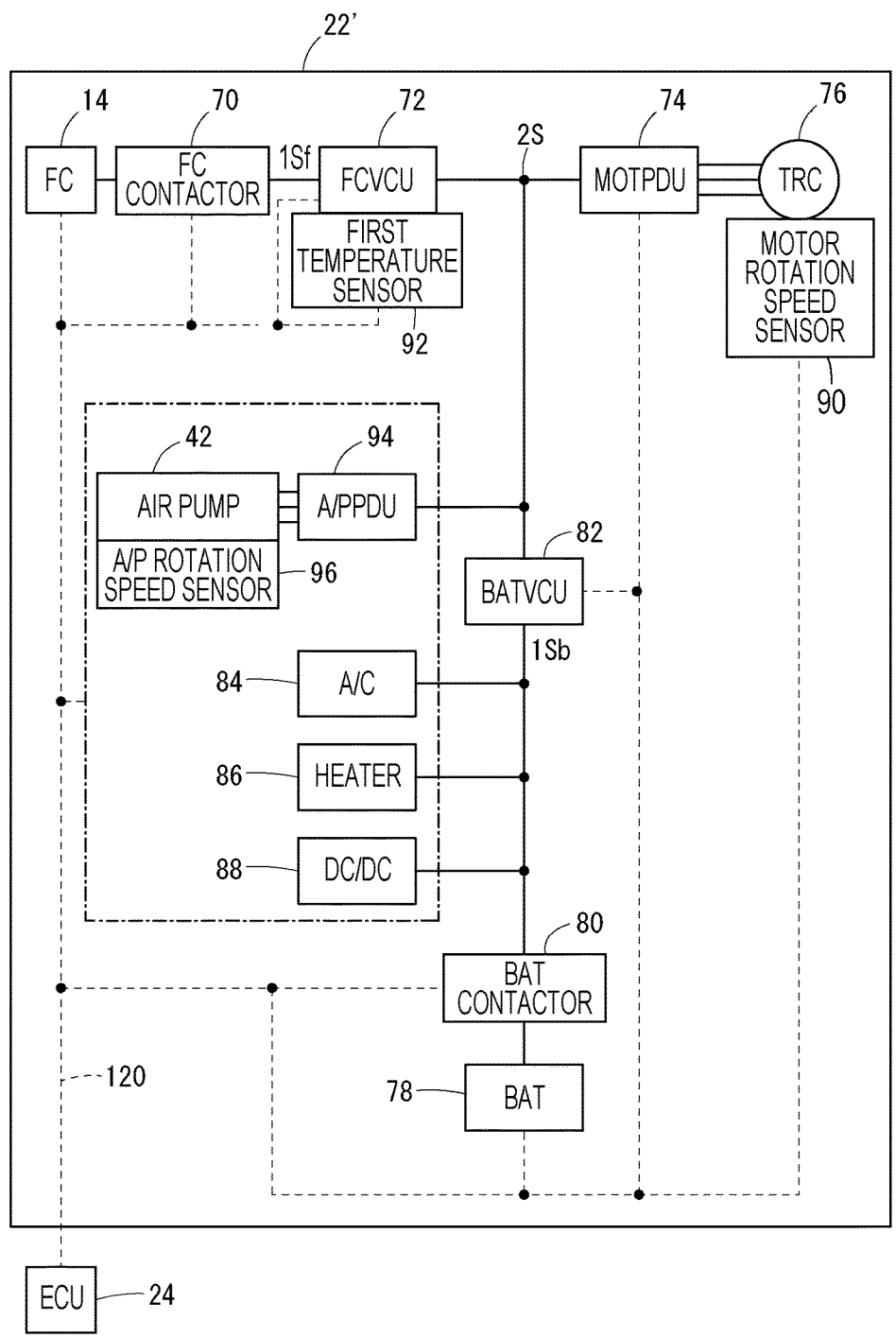
FIG. 7 is a block diagram of an electric power system according to another embodiment.

The embodiment is also applicable to an electric power system 22' illustrated in FIG. 7, in other words, the FC system 12 in which the air pump 42 includes the electric power system 22' connected with the secondary side 2S of the BATVCU 82. In this case, the electric power of the air pump 42 is restricted only when abnormity occurs to the FCVCU 72.

7. Summary of Embodiments

The FC system 12 includes the fuel battery 14 configured to generate electricity by using hydrogen gas (fuel gas) and air (oxidant gas), the BAT 78 (electric storage device), the FCVCU 72 or the BATVCU 82 (voltage adjusting device) configured to adjust voltage to be applied to a load by the fuel battery 14 or the BAT 78, the air pump 42 configured to supply air to the fuel battery 14 by consuming electric power supplied from the fuel battery 14 and/or the BAT 78, and the ECU 24 (control device) configured to control electric power of the air pump 42. The FCVCU 72 or the BATVCU 82 is disposed between the fuel battery 14 and the air pump 42. The FC system 12 also includes the first temperature sensor 92 and the second temperature sensor 98 (abnormity detecting device) configured to detect abnormity of the FCVCU 72 or the BATVCU 82. The ECU 24 restricts the upper limit Pul of electric power consumption of the air pump 42 when the first temperature sensor 92 or the second temperature sensor 98 has detected temperature abnormity of the FCVCU 72 or the BATVCU 82.

When abnormity occurs to the FCVCU 72 or the BATVCU 82, the FC system 12 can prevent in advance excessive increase of a discharge amount from the BAT 78 to the air pump 42 by restricting the electric power of the air pump 42 when the passing power of the FCVCU 72 or the BATVCU 82 is restricted. This configuration can prevent excessive decrease of the SOC of the BAT 78. Since the electric power of the air pump 42 is restricted, the air pump 42 can be prevented from being unnecessary driven.

The FC system 12 further includes the A/C 84 functioning as a defroster device and the heater 86. The ECU 24 allocates the electric power consumption Pde of the A/C 84 and the heater 86, and then sets a restricted amount of the upper limit Pul of electric power consumption of the air pump 42.

Under a condition that abnormity occurs to the FCVCU 72 or the BATVCU 82 and the passing power thereof is restricted accordingly, the defroster function can be reliably maintained by prioritizing allocation of the electric power of the A/C 84 functioning as a defroster device and the heater 86.

The ECU 24 restricts the upper limit Pul of electric power consumption of the air pump 42 with a larger decrease amount of the upper limit Pul of electric power consumption as the electric power Ptr needed for the air pump 42 is larger, and with a smaller decrease amount of the upper limit Pul of electric power consumption as the electric power Ptr needed for the air pump 42 is smaller.

An abrupt decrease of the electric power of the air pump 42 potentially causes what is called a surge that prevents operation of the air pump 42. The decrease amount of the electric power Ptr of the air pump 42 is controlled in accordance with the magnitude of the electric power Ptr needed for the air pump 42 to achieve a gradual decrease rate of the air flow rate Q2, thereby achieving a flow rate necessary for avoiding the surge. This configuration can prevent the inoperability of the air pump 42.

An embodiment of the present application is a fuel battery system including a fuel battery configured to generate electricity by using fuel gas and oxidant gas, an electric storage device, a voltage adjusting device configured to adjust voltage to be applied to a load by the fuel battery or the electric storage device, a pump configured to supply the oxidant gas to the fuel battery by consuming electric power supplied from the fuel battery and/or the electric storage device, and a control device configured to control electric power of the pump. The voltage adjusting device is disposed between the fuel battery and the pump. The fuel battery system further includes an abnormity detecting device configured to detect abnormity of the voltage adjusting device. The control device restricts the electric power of the pump when the abnormity detecting device has detected abnormity of the voltage adjusting device.

According to the embodiment, when abnormity occurs to the voltage adjusting device, excessive increase of a discharge amount from the electric storage device to the pump can be prevented in advance by restricting the electric power of the pump when passing power of the voltage adjusting device is restricted. This configuration can prevent excessive decrease of the SOC of the electric storage device. Since the electric power of the pump is restricted, the pump can be prevented from being unnecessary driven.

In the embodiment, a defroster device may be further included, and the control device may allocate the electric power of the defroster device, and then set a restricted amount of the electric power of the pump.

As in the above-described configuration, under a condition that abnormity occurs to the voltage adjusting device and the passing power thereof is restricted, a defroster function can be reliably maintained by prioritizing allocation of the electric power of the defroster device.

In the embodiment, the control device may restrict the electric power of the pump by setting a larger decrease amount of the electric power as the electric power of the pump before the restriction is larger, and setting a smaller decrease amount of the electric power as the electric power of the pump before the restriction is smaller.

An abrupt decrease of the electric power of the pump potentially causes what is called a surge that prevents operation of the pump. As in the above-described configuration, the decrease amount of the electric power of the pump is controlled in accordance with the magnitude of the electric power of the pump to achieve a gradual decrease rate of the flow rate of the oxidant gas, thereby achieving a flow rate necessary for avoiding the surge. This configuration can prevent the inoperability of the pump.

According to the embodiment, when abnormity occurs to a voltage adjusting device, excessive increase of a discharge amount from an electric storage device to the pump can be prevented in advance by restricting electric power of a pump. This configuration can prevent excessive decrease of the SOC of the electric storage device. In addition, the pump can be prevented from being unnecessary driven.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel battery system comprising:
   a fuel battery configured to generate electricity by using fuel gas and oxidant gas;
   an electric storage device;
   a voltage adjusting device configured to adjust voltage to be applied to a load by the fuel battery or the electric storage device;
   a pump configured to supply the oxidant gas to the fuel battery by consuming electric power supplied from the fuel battery and/or the electric storage device;
   a control device configured to control electric power of the pump; and
   an abnormity detecting device configured to detect abnormity of the voltage adjusting device, wherein
   the voltage adjusting device is disposed between the fuel battery and the pump, and
   the control device restricts the electric power of the pump when the abnormity detecting device has detected abnormity of the voltage adjusting device, and
   the control device restricts the electric power of the pump by setting a larger decrease amount of the electric power as the electric power of the pump before the restriction is larger, and setting a smaller decrease amount of the electric power as the electric power of the pump before the restriction is smaller.

2. The fuel battery system according to claim 1, further comprising a defroster device wherein the control device allocates electric power of the defroster device and then sets a restricted amount of the electric power of the pump.

3. The fuel battery system according to claim 1, wherein the control device restricts the electric power of the pump such that:
   a rate of the restriction of the electric power of the pump increases as an electric power need of the pump increases, and
   the rate of restriction of the electric power of the pump decreases as the electric power need of the pump decreases.

4. A fuel battery system comprising:
   a fuel battery to generate electricity using fuel gas and oxidant gas;
   an electric storage;
   a voltage adjuster connected to at least one of the fuel battery and the electric storage and configured to adjust voltage output from the fuel battery or the electric storage to output the adjusted voltage to a load;
   a pump to supply the oxidant gas to the fuel battery using electric power output from at least one of the fuel battery and the electric storage, the voltage adjuster being connected between the fuel battery and the pump;
   an abnormity detector to detect abnormity in the voltage adjuster; and
   circuitry configured to restrict the electric power supplied to the pump in a case where the abnormity detector detects the abnormity in the voltage adjuster,
   wherein the circuitry restricts the electric power of the pump by setting a larger decrease amount of the electric power as the electric power of the pump before the restriction is larger, and setting a smaller decrease amount of the electric power as the electric power of the pump before the restriction is smaller.

5. The fuel battery system according to claim 4, further comprising a defroster device,
   wherein the circuitry allocates electric power of the defroster device and then sets a restricted amount of the electric power of the pump.

6. The fuel battery system according to claim 4, wherein the circuitry is configured to restrict the electric power of the pump such that:
   a rate of the restriction of the electric power of the pump increases as an electric power need of the pump increases, and
   the rate of restriction of the electric power of the pump decreases as the electric power need of the pump decreases.

7. A control method for a fuel battery system including a fuel battery, an electric storage, a voltage adjuster to adjust voltage output from the fuel battery or the electric storage to output the adjusted voltage to a load, and a pump to supply an oxidant gas to the fuel battery using electric power output from at least one of the fuel battery and the electric storage, the voltage adjuster being connected between the fuel battery and the pump, the control method comprising:
   detecting abnormity in the voltage adjuster; and
   restricting the electric power supplied to the pump in a case where the abnormity in the voltage adjuster is detected,
   wherein the electric power of the pump is restricted by setting a larger decrease amount of the electric power as the electric power of the pump before the restriction is larger, and setting a smaller decrease amount of the electric power as the electric power of the pump before the restriction is smaller.

8. The control method according to claim 7, wherein electric power of a defroster device is allocated and then a restricted amount of the electric power of the pump is set.

9. The control method according to claim 7, wherein the electric power of the pump is restricted such that:
   a rate of the restriction of the electric power of the pump increases as an electric power need of the pump increases, and
   the rate of restriction of the electric power of the pump decreases as the electric power need of the pump decreases.

* * * * *